Patented Aug. 20, 1929.

1,725,564

UNITED STATES PATENT OFFICE.

WILLIAM S. CALCOTT AND WILLIAM A. DOUGLASS, OF PENNS GROVE, NEW JERSEY, AND OLIVER M. HAYDEN, OF WILMINGTON, DELAWARE, ASSIGNORS TO E. I. DU PONT DE NEMOURS & COMPANY, OF WILMINGTON, DELAWARE, A CORPORATION OF DELAWARE.

PROCESS OF RETARDING DETERIORATION OF RUBBER AND PRODUCT.

No Drawing.     Application filed November 19, 1927. Serial No. 234,549.

This invention relates to the art of retarding the deterioration of rubber or rubber-containing materials by the incorporation of certain agents having specific effects in retarding deterioration. More particularly the invention involves the use of certain combinations of chemical substances which jointly retard the deteriorations caused by heat and oxygen.

The deterioration of rubber goods has been thought to be due largely to oxidation of the rubber compound. This deterioration is very slow at ordinary temperatures and therefore to make possible the comparison of the aging characteristics of various mixes for the production of rubber goods, accelerated aging tests have been developed. The older of these tests commonly known as the "Geer oven test" consists in subjecting samples of vulcanized rubber to a slow stream of air at a temperature of 70° C. Due to the fact that in use certain compounds such as inner tubes of bus tires, are occasionally subjected to temperatures as high as 90–100° C., the Geer oven temperature has been raised by some investigators to these higher temperatures.

It was found that certain stocks aged in the Geer oven did not give the same results as by natural aging and with the belief that this difference was due to an over emphasis of the thermal effect, the oxygen bomb aging test was developed. In this test the effect of oxygen is increased by carrying out the accelerated aging test under 300 lbs. oxygen pressure at a temperature of 60 or 70° C. Under these conditions the accelerated aging test gave the same type of deterioration as that obtained by natural aging.

We have found that a reagent may be very efficient as an oxidation inhibitor as shown by the oxygen bomb test, and without appreciable effect as a heat resister when tested in the Geer oven. On the other hand, other compounds may be much more efficient as heat resisters and much less efficient as oxidation inhibitors. Although it is probable that the effects of heat and oxygen are not entirely independent of each other, no one reagent tested has been found to be equally efficient in preventing these two types of deterioration.

The primary object of our invention is to retard the deterioration of rubber caused by heat and oxygen by the incorporation of a combination of reagents, the components of the combination being specifically adapted to the prevention of a certain type of deterioration.

Another object is to retard the deterioration of rubber by the use of a mixture of pure materials, easily duplicated and standardized. Other objects will appear hereinafter.

We have discovered that certain secondary aromatic amines, such as phenyl-alpha-naphthylamine, are outstanding as oxidation inhibitors. For example, a stock consisting of rubber 100, zinc oxide 18.15, sulfur 2.75, diorthotolylguanidine .625, and phenyl-alpha-naphthylamine 1.25 cured for 45 minutes at 141.5° C. retained its elasticity and desirable physical properties when aged in the oxygen bomb for forty-four days at 70° C. under 300 lbs. oxygen pressure. A control sample cured to the same degree was completely deteriorated in three days, while another control sample containing the optimum amount of a commercial antioxidant had deteriorated completely in fourteen days. When the same stock was subjected to an accelerated aging test in the Geer oven at 70° or 90° C., the resistance to deterioration, although better than the control containing no antioxidant, was inferior to the resistance obtained by the use of the optimum amount of a commercial antioxidant.

Aromatic diamino compounds, such as meta toluylene diamine, although difficult to disperse satisfactorily, have been shown to possess exceptional heat-resisting qualities when tested in the Geer oven at 70° or 90° C., but only moderate resistance to deterioration when subjected to an accelerated aging test in the oxygen bomb.

With the appreciation of the specific action of certain age-resisting materials, we have discovered that a mixture having improved age-resisting properties is obtained by combining two or more materials, each of which contributes its specific property. Since these mixtures are composed of commercially pure compounds, easily analyzed and standardized, the resulting mixtures are of uniform composition and can be duplicated.

As a specific example, 100 parts meta toluylene diamine, 100 parts stearic acid, and 200 parts phenyl-alpha-naphthylamine are melted together and subsequently converted to the solid form by any of the well known methods which will give a uniform product. This mixture has been found to impart exceptional resistance to deterioration to various typical stocks tested in both the oxygen bomb and the Geer oven.

Other secondary aromatic amines and aromatic diamino compounds than those specified in the case illustrated above may be employed. For example, in place of phenyl-alpha-naphthylamine we may substitute diphenylamine, di-tolylamine, di-xylylamine, tolyl-alpha-naphthylamine, diphenyl ethylene diamine, or B-B-di-naphthylamine and in place of meta-toluylene diamine we may substitute meta-phenylene diamine.

By way of further examples we have discovered that non-accelerating aldehyde-amine condensation products such as the acetaldehyde aniline acid condensate and aromatic diamino compounds such as meta-phenylene-diamine, meta-toluylene-diamine, benzidine, tolidine, dianisidine, naphthalene diamine, etc., are efficient in retarding the type of deterioration which takes place in the so-called Geer oven at 90° C. This class of substances may be termed heat resisters or agents, primarily retarding deterioration due principally to heat. When these compounds are incorporated into a rubber mix, and the vulcanized rubber is subjected to the oxygen bomb test at 70° C. under 300 lbs. oxygen pressure, it is found that although there is some retardation of the deterioration, they are not as effective as certain other compounds herein described, which are particularly effective in retarding deterioration due primarily to oxygen.

As further examples of such oxygen resisters, that is to say, compounds whose primary function is to resist deterioration due to oxygen, we have found the following: thiourea, certain compounds containing the imino group, diphenyl-amine, the various ditolyl-, xylol and mixed phenyl, tolyl or xylyl-amines, phenyl beta naphthylamine, the tolyl, xylyl and dinaphthylamines, and diphenyl ethylene diamine, etc. When these compounds are used in rubber mixes which are tested in the Geer oven, it is found that there is some retardation of the deterioration, but not so much as that imparted by the aforesaid heat resisters.

Compounds which have been found to exhibit a specialized heat resisting or oxidation resisting function are grouped below:

Group A.
(Compounds whose primary action retards the deterioration due to heat.)
1. Essentially non-accelerating acetaldehyde amine condensation products.
2. Meta phenylene diamine.
3. Meta toluylene diamine.
4. Benzidine.
5. Dianisidine.
6. Tolidine.
7. Naphthalene diamines.

Group B.
(Compounds whose primary action retards the deterioration due to oxidation.)
1. Diphenyl ethylene diamine.
2. Diphenylamine.
3. Various diotolyl amines:
   Di-p-tolyl amine
   Di-m-tolyl amine
   Di-o-tolyl amine.
   Mixed tolyl amines:
   o-p tolyl amine
   o-m tolyl amine
   p-m tolyl amine.
4. Phenyl tolyl amines.
5. Various dixylyl amines.
6. Mixed phenyl-tolyl, xylyl naphthylamines, phenyl-a-naphthylamine, tolyl-a-naphthylamine, phenyl-beta-naphthylamine.
7. Dinaphthylamines:
   a-a-dinaphthylamine
   b-b-dinaphthylamine.
8. Mixed naphthylamines: a-b-naphthylamines.

There is also an intermediate class of substances which possess neither outstanding heat resisting nor oxygen-resisting properties. As examples, the various polyhydric phenols, amino and substituted amino phenols, aldehyde amine condensation products such as those resulting from acetaldol and alpha naphthylamine, are given.

Still further illustrations of the principles of this invention consist in the following procedures:

*Method of producing a rubber composition which possesses exceptional resistance to deterioration when tested in the oxygen bomb.*

A homogeneous mixture of 10 parts B B' dinaphthylamine and 1 part meta phenylene-diamine is made by any of the well known methods and 1.25 parts of this mixture are incorporated into 100 parts rubber, 18.15 parts zinc oxide, 2.25 parts sulfur and 0.625 parts di-ortho-tolyl guanidine. The stock after curing for 45 minutes at 141.5° C. possesses exceptional resistance to deterioration when tested in the oxygen bomb (oxidation resistance) at 70° C. under 300 lbs. oxygen pressure, but only fair resistance when tested in the Geer oven (heat resistance).

*Method of producing a rubber composition which possesses exceptional resistance to deterioration when tested in the Geer oven at 90° C.*

Two parts of a homogeneous mixture of 10 parts benzidine and 1 part diphenyl ethylene diamine are mixed with rubber 100, zinc oxide 5, blanc fixe 25, rubber orange 2R-1, Vulcanex 0.5 and sulfur 2.75. After curing for 40 minutes at 141.5° C. the stock possesses exceptional resistance to deterioration when tested in the Geer oven at 90° C. (heat resistance) but only fair resistance in the oxygen bomb (oxidation resistance).

*Method of altering the age resistant properties of compounds belonging to the intermediate class.*

P-aminophenol is a typical compound which although possessing neither outstanding anti-oxidant nor heat resistant properties, is somewhat active in retarding the deterioration in either test. If it is desired to improve the resistance to the deterioration when tested in the oxygen bomb, homogeneous mixtures containing varying amounts of para-tolyl-alpha naphthylamine may be incorporated, the amount depending upon the improvement in resistance desired. Conversely, if it is desired to improve the resistance to deterioration in Geer oven, homogeneous mixtures of para-amino-phenol containing dianisidine may be employed.

*Method of producing a rubber composition which possesses exceptional resistance to both types of deterioration.*

A homogeneous mixture of 100 parts meta toluylene diamine, 100 parts stearic acid, and 200 parts phenyl alpha naphthylamine is melted together and subsequently converted to the solid form by any of the well known methods which will give a uniform product. By the incorporation of 1-5 parts of this mixture into a rubber composition containing rubber 100, zinc oxide 18.15, sulfur 2.75, di-ortho-tolyl-guanidine .5625, a vulcanized rubber is produced after curing for 45 minutes at 141.5° C. which possesses the desired resistance to deterioration when tested in both or either the Geer oven and the Bierer oxygen bomb.

The particular mode of introducing the deterioration retarders of this invention may vary according to circumstances, and may occur prior to vulcanization in compounding operations, and also subsequent to vulcanization in other types of operations. The said oxidation and heat resisters may be mixed before use, or they may be added in succession in the process of manufacture. The particular proportions in which these oxidation and heat resisters are respectively used may be varied, but we have found it highly advantageous to employ them in certain definite proportions, the respective amounts thereof being proportioned directly in accordance with the respective deteriorating effects of oxidation and heat in the exposure to which the rubber article is to be subjected while in use. Thus, if rubber is being manufactured into an article which must in actual use resist deterioration from heat and oxygen equally well, being severely subjected to both influences, it may be found advantageous to use equal proportions of the two inhibitors. On the other hand, if rubber is to be manufactured into an article where the influence of heat in actual use is probably going to be relatively very small, then the proportion of the heat resister will be also relatively much smaller than the proportion of oxidation resister added. And vice versa, where the effect of heat is probably going to be relatively great, then the proportion of heat resister must be relatively increased. Thus, we have found that the resistance to the two types of agent can be independently controlled and definitely determined.

In order to ascertain the respective specific properties of the chemical substances herein enumerated, together with members of the same classes of compounds and their equivalents, it will be sufficient to test these by the Geer oven test conducted at 70°, or preferably 90° C., and also by the oxygen bomb test at 70° C. and 300 lbs. pressure, and with this information to select pairs of agents which will jointly resist the effects of oxygen and heat in accordance with the use to which the ultimate rubber article is to be put. For example, mechanical goods must resist oxidation, but are very seldom subjected to an elevated temperature. In these cases, where a pair of resisters is employed, the one would be in largest proportion which primarily resisted oxidation as shown by the aforesaid testing methods. Again, where gaskets for steam lines are to be manufactured, a resister would be selected whose primary function is to resist the action of heat. In the case of the manufacture of inner tubes, such as bus tires, which are subjected to the combined influence of heat and oxygen, approximately an equal proportion of a heat resister and an oxygen resister would be employed.

It is to be understood that wherever in the appended claims the expression "rubber" is used it is to include not only natural rubber such as Hevea, balata, or gutta percha but also rubber-like materials made by synthesis and generally known as synthetic rubber, wherever they are subject to deterioration of the character described.

As many apparently widely different embodiments of this invention may be made without departing from the spirit thereof, it will be understood that it is not intended to limit the invention to the specific embodiments herein set forth except as indicated in the appended claims.

We claim:

1. A process of retarding the deterioration of rubber under the action of oxidation and heat, which comprises incorporating into the rubber two or more substances, one of which contributes its primary action in retarding the deteriorating influence of heat, and another which contributes its primary action in retarding the deteriorating influence of oxygen.

2. A process of retarding the deterioration of rubber under the action of oxidation and heat, which comprises incorporating into the rubber two or more substances, one of which contributes its primary action in retarding the deteriorating influence of heat, and another which contributes its primary action in retarding the deteriorating influence of oxygen, the respective amounts of said substances being proportioned directly in accordance with the respective deteriorating effects of oxidation and heat in the exposure to which the rubber article is to be subjected while in use.

3. The invention of claim 1, in which the oxidation retarder is a secondary diaromatic amine.

4. The invention of claim 1, in which the heat retarder is an aromatic diamino compound.

5. The invention of claim 1, in which the substances are phenyl-alpha-naphthylamine and meta-toluylene-diamine.

6. Rubber containing one component which contributes its primary action in retarding deterioration due to heat, and another component which contributes its primary action in retarding deterioration due to oxidation.

7. A mixture of agents adapted to retard the deterioration of rubber, said mixture comprising one compound which contributes its primary action in retarding deterioration due to heat, and another compound which contributes its primary action in retarding deterioration due to oxygen.

8. The invention of claim 1 in which a mixture of phenyl-alpha-naphthylamine, stearic acid, and meta-toluylene diamine is added to the rubber.

9. The invention of claim 7 wherein the agents comprise meta-toluylene diamine and phenyl-alpha-naphthylamine.

10. The invention of claim 7 wherein the agents comprise, respectively, a secondary diaromatic amine and a primary aromatic diamino compound.

11. An agent adapted to retard the deterioration of rubber, comprising phenyl-alpha-naphthylamine, metal-toluylene diamine, and stearic acid.

12. The process of retarding the deterioration of rubber under the action of oxidation and heat, which comprises incorporating into the rubber two substances, each of which is in itself effective in retarding the deterioration of rubber, the two substances differing in that if two rubber compositions be made, one containing the one substance and the other the other substance, and these two compositions be exposed to air at 70° temperature and atmospheric pressure, one compound will prove more effective in retarding deterioration than the other, while if the same two rubber compositions be exposed to oxygen at a temperature of 70° and a pressure of 300 lbs. the order of effectiveness of the two substances will be reversed.

13. A product for retarding the deterioration of rubber under the action of oxidation and heat, which product comprises two substances, each of which is in itself effective in retarding the deterioration of rubber, the two substances differing in that if two rubber compositions be made, one containing the one substance and the other the other substance, and these two compositions be exposed to air at 70° temperature and atmospheric pressure, one compound will prove more effective in retarding deterioration than the other, while if the same two rubber compositions be exposed to oxygen at a temperature of 70° and a pressure of 300 lbs. the order of effectiveness of the two substances will be reversed.

14. A mixture of agents adapted to retard the deterioration of rubber, said mixture comprising at least one of the compounds of Group A in combination with at least one of the compounds of Group B.

15. The process of retarding the deterioration of rubber under the action of oxidation and heat, which comprises incorporating into the rubber at least one of the compounds of Group A, together with at least one of the compounds of Group B.

16. A process of retarding the deterioration of rubber under the action of oxidation and heat, which comprises incorporating into the rubber a secondary diaromatic amine and a primary aromatic diamino compound.

17. A rubber compound containing at least one of the compounds of Group A, together with at least one of the compounds of Group B.

18. A rubber compound containing two substances, each of which is in itself effective in retarding the deterioration of rubber, the two substances differing in that if two rubber compositions be made, one containing the one substance and the other the other substance, and these two compositions be exposed to air at 70° temperature and atmospheric pressure, one compound will prove more effective in retarding deterioration than the other, while if the same two rubber compositions be exposed to oxygen at a temperature of 70° and a pressure of 300 lbs. the order of effectiveness of the two substances will be reversed.

19. A rubber compound containing meta toluylene diamine and phenyl-alpha-naphthylamine.

20. A rubber compound containing a secondary diaromatic amine and a primary aromatic diamino compound.

21. A mixture of agents adapted to retard the deterioration of rubber, said mixture comprising a phenyl-naphthylamine and a primary aromatic diamino compound.

22. A mixture of agents adapted to retard the deterioration of rubber, said mixture comprising a phenyl-naphthylamine and meta-toluylene-diamine.

23. A mixture of agents adapted to retard the deterioration of rubber, said mixture comprising a primary aromatic diamine and a compound of the class consisting of phenyl-alpha-naphthylamine and phenyl-beta-naphthylamine.

24. A mixture of agents adapted to retard the deterioration of rubber, said mixture comprising meta-toluylene-diamine and a compound of the class consisting of phenyl-alpha-naphthylamine and phenyl-beta-naphthylamine.

In testimony whereof we affix our signatures.

WILLIAM S. CALCOTT.
WILLIAM A. DOUGLASS.
OLIVER M. HAYDEN.